May 18, 1965 B. D. ALLEMAN 3,184,021
VARIABLE SPEED DEVICE
Filed Sept. 14, 1961 4 Sheets-Sheet 1
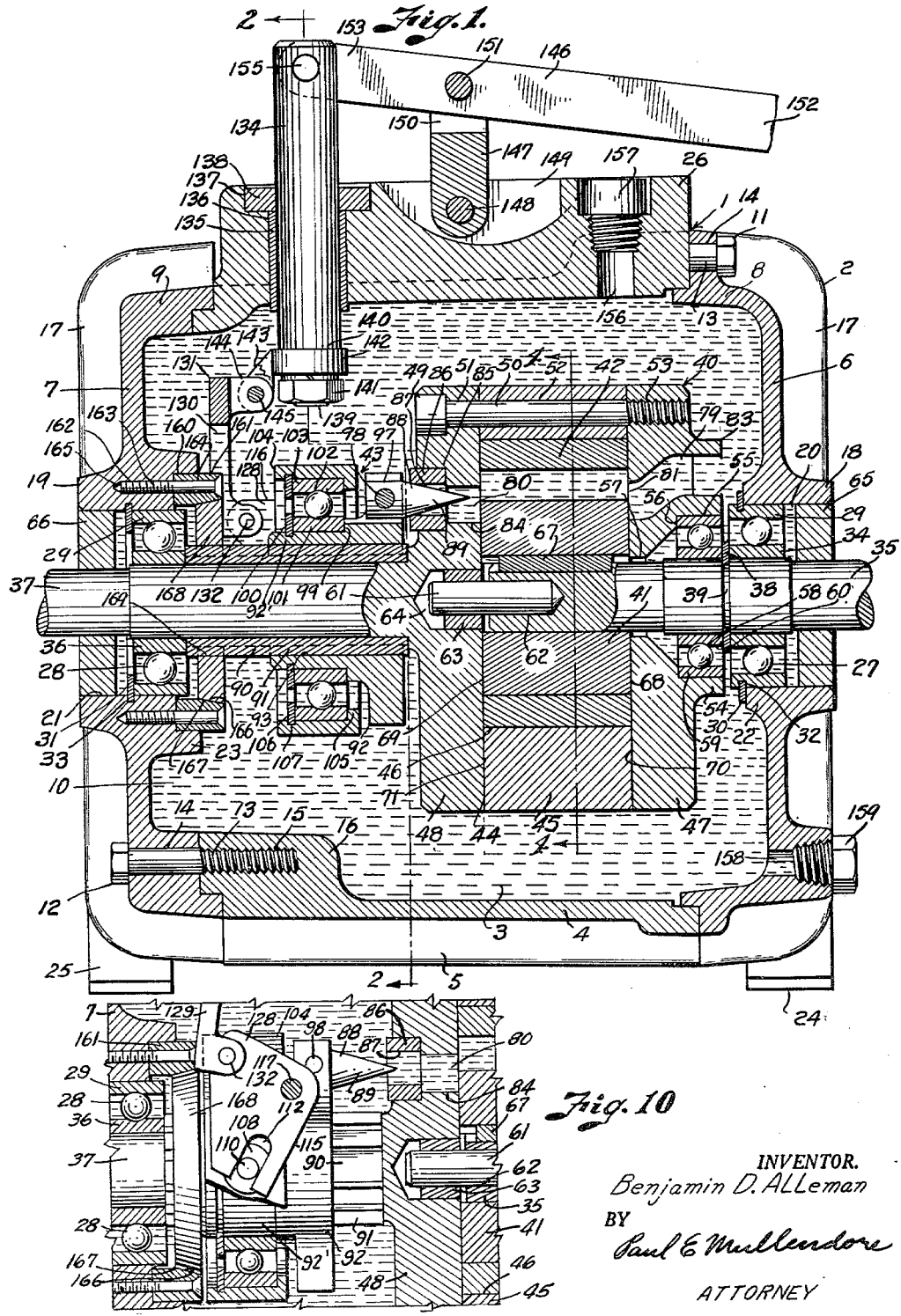
INVENTOR.
Benjamin D. Alleman
BY
Paul E. Mullendore
ATTORNEY May 18, 1965  B. D. ALLEMAN  3,184,021
VARIABLE SPEED DEVICE
Filed Sept. 14, 1961  4 Sheets-Sheet 2
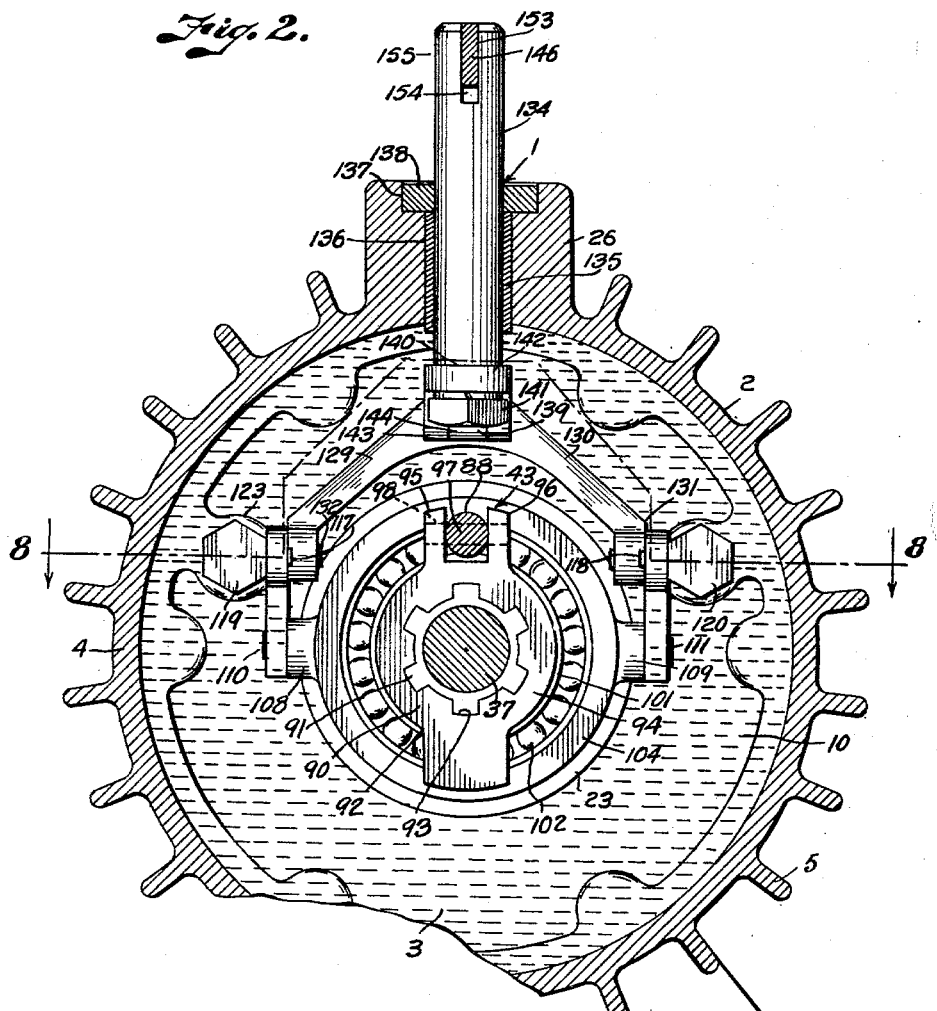
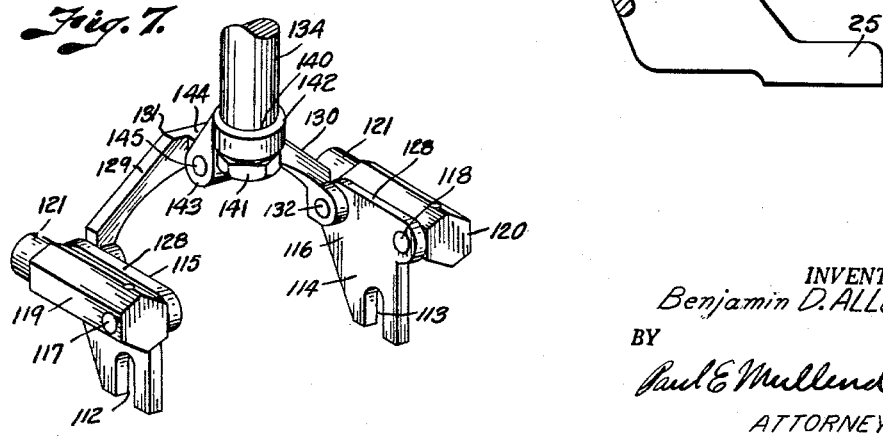
INVENTOR.
Benjamin D. Alleman
BY
Paul E. Mullendore
ATTORNEY

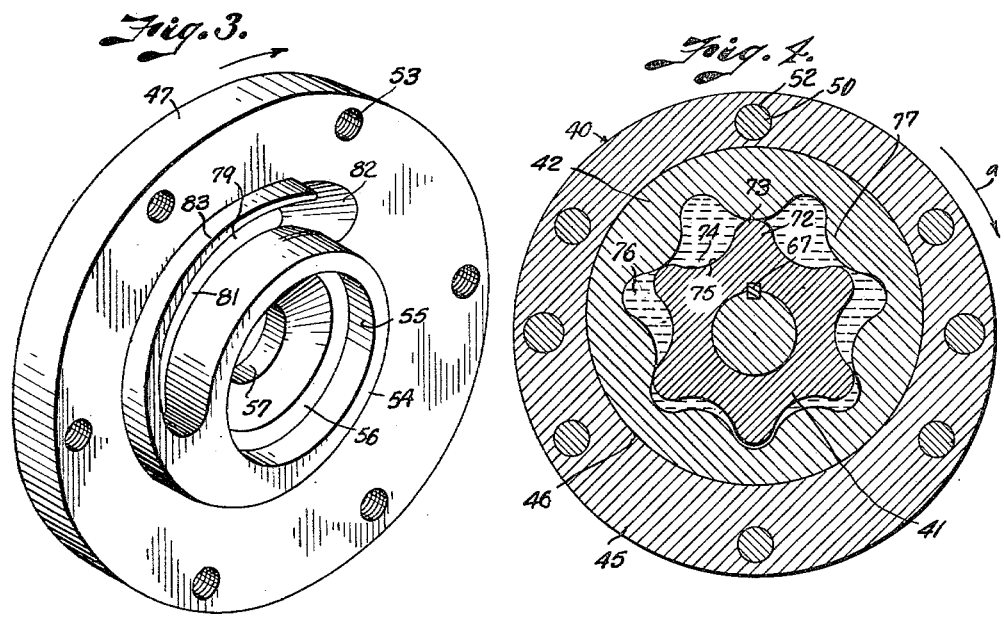
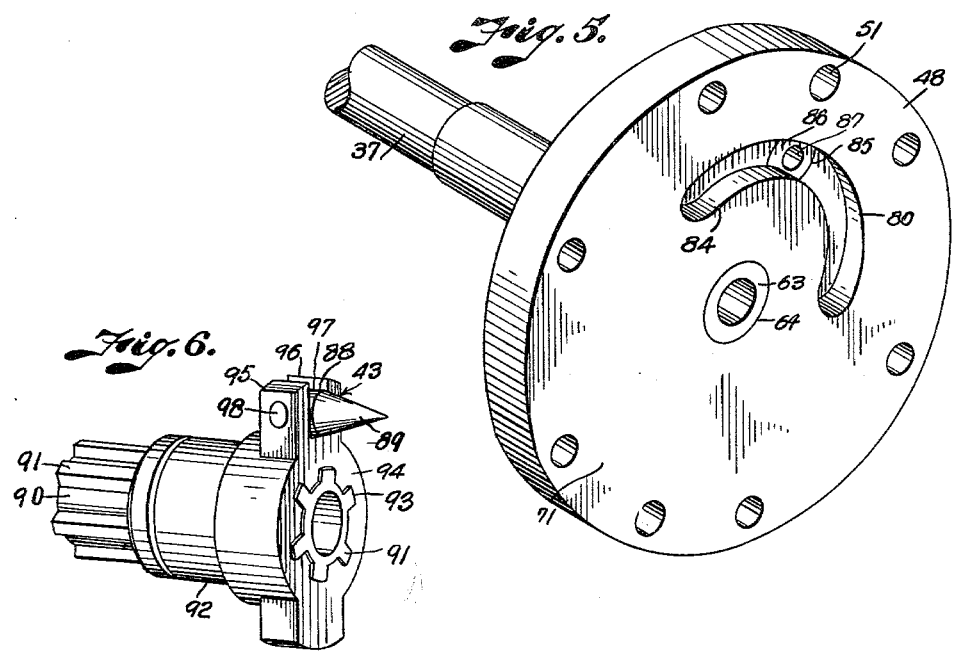

May 18, 1965 B. D. ALLEMAN 3,184,021
VARIABLE SPEED DEVICE
Filed Sept. 14, 1961 4 Sheets-Sheet 4

INVENTOR.
Benjamin D. Alleman
BY
Paul E. Mullendore
ATTORNEY

United States Patent Office 3,184,021
Patented May 18, 1965

3,184,021
VARIABLE SPEED DEVICE
Benjamin D. Alleman, 2213 W. Broadway, Enid, Okla.
Filed Sept. 14, 1961, Ser. No. 138,093
3 Claims. (Cl. 192—58)

This invention relates to a variable speed device for changing the relative speed between a driving and driven mechanism, and more particularly to a hydraulic device of this character that incorporates a driving element having teeth cooperating with the teeth of the driven element for producing flow of a hydraulic fluid, and has for its principal object to provide a simple valving mechanism for metering the flow of the hydraulic fluid to change speed between the driving and driven elements.

A further object of the invention is to provide a speed changing device having a simplified construction capable of a positive control of the speed with a smooth flow of power throughout the entire range from the maximum speed to zero.

Other objects of the invention are to provide a needle type valve rotatable with the driven element to obtain a more positive infinite control of the speed; to provide a simple actuating mechanism for operating the needle valve smoothly from maximum revolutions down to no revolutions or zero speed; to provide means for preventing cavitation of the fluid around the rotary elements to assure full capacity flow of the hydraulic fluid between the driving and driven elements; and to provide a brake mechanism actuated by the valve operating mechanism to prevent creeping of the driven element when the speed of the driven element has been reduced to zero.

In accomplishing these and other objects of the invention, I have provided improved structure, the preferred form of which is illustrated in the accompanying drawings, wherein:

FIG. 1 is a central section through a variable speed device having the features of the present invention.

FIG. 2 is a cross sectional view on the line 2—2 of FIG. 1, particularly illustrating the needle valve actuating mechanism.

FIG. 3 is a perspective view of the intake manifold as viewed from the outer side thereof, to better illustrate the intake port and the arrangement thereof to prevent cavitation.

FIG. 4 is a cross section through the driving and driven elements for effecting flow of hydraulic fluid to the metering valve.

FIG. 5 is an inner face view of the discharge manifold.

FIG. 6 is a perspective view of the needle valve and its carrier.

FIG. 7 is a perspective view of the linkage for shifting the needle valve carrier.

FIG. 10 is a fragmentary view showing the collar portion of the valve carrier engaging the brake shoe.

Figure 8:
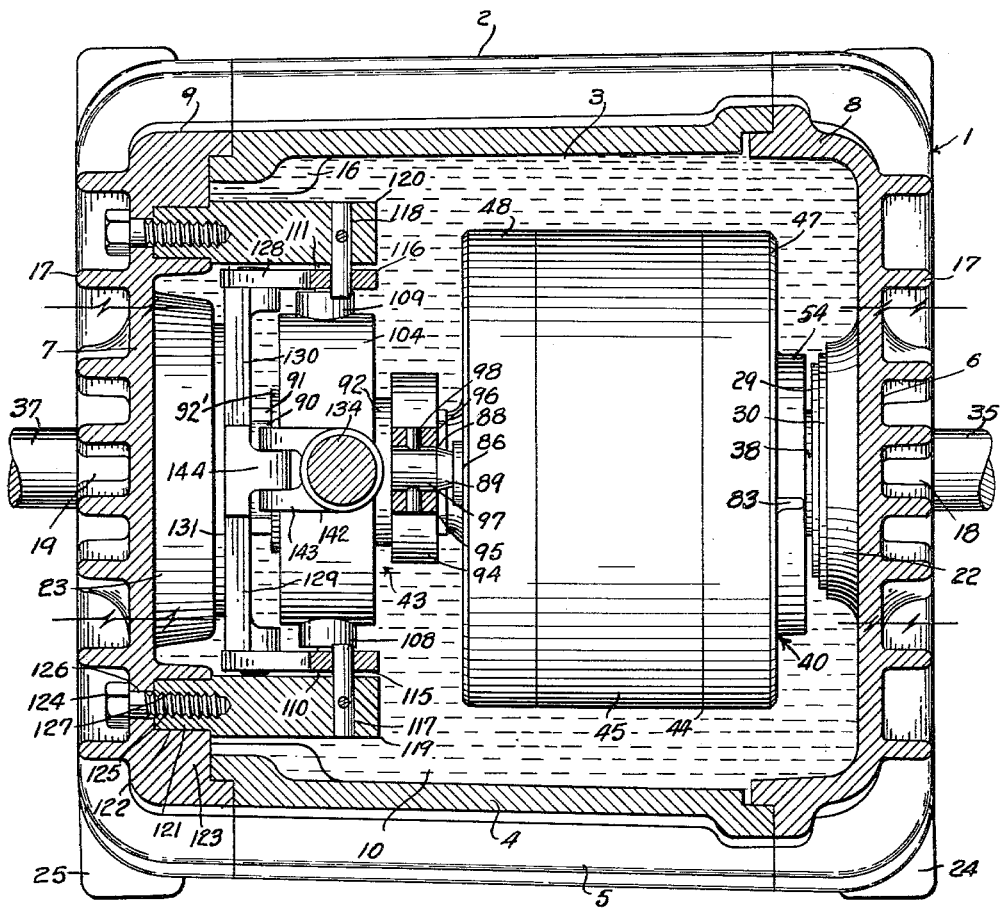
FIG. 8 is a horizontal section on the line 8—8 of FIG. 2, particularly illustrating the support of the mechanism illustrated in FIG. 7.

Referring more in detail to the drawings:

1 designates a variable speed change device constructed in accordance with the present invention, and which includes a stationary or fixed casing 2 for containing the working parts in submergence in a hydraulic fluid 3. The casing 2 includes a central ring-shaped section 4 having spaced apart longitudinally extending fins 5 on the exterior face thereof for dissipating heat of the hydraulic fluid. The ends of the central section 4 are closed by end plates 6 and 7 having inturned peripheral flanges 8 and 9 to cooperate with the interior of the central section, for providing a closed fluid-tight chamber 10. The end plates 6 and 7 are fixed to the sides of the central section by fastening devices, such as machine screws 11 and 12, having threaded shanks 13 extending through openings 14 in the plates and into threaded sockets 15 that are provided in bosses 16 of the central section. The exterior faces of the end plates 6 and 7 have fins 17 radiating from bearing bosses 18 and 19 and corresponding with the longitudinal fins 5. The bosses 18 and 19 encircle axial openings 20 and 21 which continue inwardly through inwardly extending bosses 22 and 23 on the inner sides of the plates. The end plates 6 and 7 also have laterally extending feet 24 and 25 that form a fixed support for the casing 2. The central section 4 is further provided with a longitudinal boss 26 on the top side thereof, for a purpose later described.

Inset into the opening 20 and 21 are anti-friction bearings 27 and 28 having their outer races 29 closely fitting within the openings 20 and 21 and which are retained from outward movement therein by retaining rings 30 and 31. The retaining ring 30 fits within a groove 32 of the outer race 29 of the bearing 27 and engages the inwardly extending boss 22. The retaining ring for the antifriction bearing 28 is contained in an internal groove 33 located between the inner and outer bosses 19 and 23.

The inner race 34 of the antifriction bearing 27 journals a power input shaft 35, while the inner race 36 of the other bearing 28 mounts a power output or driven shaft 37. The power input shaft 35 extends into the chamber 10 and is retained from longitudinal movement in the antifriction bearing 27 by a retaining ring 38 carried in a groove 39 of the shaft 35 and engaging the inner face of the inner race 34.

The power output shaft 37 also extends into the chamber 10 in axial registry with the power shaft and cooperates therewith in mounting a hydraulic coupling mechanism 40. The mechanism 40 includes a driving element 41 and a driven element 42 which circulate a stream of a hydraulic fluid 3 therethrough under control of a metering mechanism, generally indicated at 43, that forms part of the present invention.

The driven element 42 includes a rotary casing 44 with a ring shaped central section 45 having an eccentrically located cylindrical chamber 46 that is closed at opposite sides thereof by disks 47 and 48, forming, respectively, an intake and a discharge manifold. The disk 48 is fixed to the inner end of the power output shaft 37 to rotate therewith, in fact the disk 48 may be an integral part of the shaft 37, as shown in FIG. 1. The disk 47, like the disk 48, conforms to the outer diameter of the central section 45, and is secured thereto by cap screws 49, having shanks 50 extending through openings 51 in the disk 48 through registering openings 52 in the central section and into internally threaded sockets 53 of the disk 47.

The disk 47 carries on the outer face side thereof a hub 54 having an axial recess 55 providing an internal shoulder 56 encircling an axial opening 57 for the shaft 35 to pass therethrough. Contained in the axial recess 55 is an antifriction bearing 58 having an outer race 59 seating against the shoulder 56 and having an inner race 60 mounted upon the shaft 35 and engaging the retaining ring 38, as best shown in FIG. 1. The shaft 35 terminates near the inner face of the disk 48 and is retained in axial alignment therewith by a pin 61. The pin 61 fits snugly within a bore 62 in the terminal end of the shaft 35 and projects through a bearing 63 carried in a recess 64 formed in the inner face of the disk 48. The ends of the axial openings 20 and 21 are closed on the outer sides of the bearings 27 and 28 with fluid seals 65 and 66 to prevent leakage of the hydraulic fluid about the shafts 35 and 37.

The driving element 41 is generally in the form of a gear that is fixed to the power input shaft 35 by a key or spline 67. The driving element 41 is of the width of the chamber 46 in that the end faces 68 and 69 fit closely the inner faces 70 and 71 of the intake and discharge manifolds. The driving element 41 is provided on the periphery thereof with a plurality of teeth 72 having rounding tips 73, with the spaces 74 between the teeth being formed on arcs 75 to provide spaces 76.

The driven element 42 comprises a cylinder snugly rotatable within the eccentric chamber 46 of the central section and having a width corresponding to the width of the driving element 41. The inner periphery of the driven member has teeth 77 conforming in shape to the spaces 74 between the teeth 72, and the spaces 76 between the teeth 77 correspond with the teeth 72, whereby rotation of the driving element 41 causes the driven element 42 to planetate about the periphery of the driving element, with both driving and driven elements revolving in the same direction.

Each tooth 72 of the driving element 41 is in constant sliding fluid-tight contact with the outer or driven element as the elements turn, the spaces between the teeth of the driving element and the driven element gradually increasing in size through the first half of the revolution in the direction of the arrow designated by "a" in FIG. 4, and the spaces closing in the second half of the revolution to draw hydraulic fluid through an intake port 79 in the disk 47 and discharge the fluid through an outlet port 80 in the disk 48.

Figure 9:
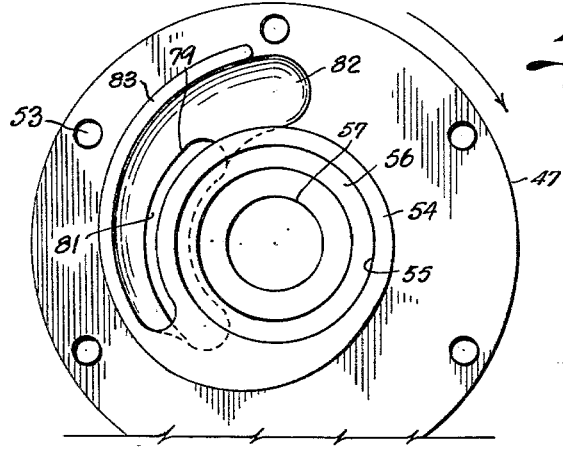
FIG. 9 is a front face view of the intake manifold shown in FIG. 3.

The inlet port 79 in the disk 47 is best illustrated in FIGS. 3 and 9. As shown in these figures, the port 79 comprises an arcuate slot 81 extending about one diametrical side of the hub 54, with the forward end of the slot being enlarged on the outer face of the disk to form a funnel 82 for facilitating entrance of the hydraulic fluid into the port 79. To further facilitate entrance of fluid and to assure flow of fluid through the entire port to avoid cavitation, the outer diametrical side of the slot 81 has a spiral fin 83 extending from one side of the hub 54 and terminating short of the funnel 82, to provide an inlet at the funnel and in the direction of rotation, to scoop the hydraulic fluid into the port 79.

The outlet port 80 comprises an arcuate groove 84 in the inner face 71 of the disk 48, substantially conforming in length to the slot 81 of the intake port and arranged symmetrically on the side of the gradually decreasing spaces, to receive the fluid that is forced out of the decreasing spaces incidental to rotation of the driving and driven elements, as later to be described. Connected with the groove 84 and located in the outer face of the disk 48 is a recess 85 for containing a valve seat member 86 that is securely pressed into the recess. Formed in the valve seat is a port 87 that directly connects with the groove 84, as best shown in FIGS. 1 and 5.

With the structure thus far described, it is apparent that the fluid flows through the inlet port into the spaces of gradually increasing size and is squeezed therefrom as the spaces gradually reduce on the opposite side of the rotating elements.

Attention is here directed to the number of teeth in the driving and driven elements. In FIG. 4, it will be noted that the driving element has one less tooth than the driven element, and this ratio is the same regardless of the number of teeth on the driving element, that is, for a given number of teeth on the driving element, the driven element has one additional tooth. Also, the points of contact between the teeth of the driving and driven elements revolve only once for each seven to nine shaft revolutions.

The inlet and outlet ports are of relative size so that when the rotary casing is held stationary and the power shaft is revolving, the flow through the outlet port is sufficient so that back pressure is not built up and there is no tendency for the rotary casing 44 to turn. However, if the fluid through the discharge port of the valve seat is throttled to reduce the discharge of the fluid therethrough, the rotary casing 44 will start to rotate and increase in speed with throttling of the flow through the port 87 up to the point when the fluid is completely shut off through the outlet port of the valve seat, at which time the power output shaft 37 is revolving at its maximum speed relative to the power input shaft 35. Likewise, as the port 87 is gradually opened, the speed of the shaft 37 is correspondingly decreased until the port is fully opened, at which time the output shaft 37 ceases to rotate except for possible creeping of the mechanism.

In order to meter the flow through the outlet port and thereby control the speed of the output shaft, I provide a valve 88 with a cone or needle shaped valving portion 89 having a base diameter large enough to completely plug the outlet port in one position of the valve and to gradually open the port as the point of the valve is retracted therefrom, as now to be described.

Fixed on the power output shaft 37 between the disk 48 and the antifriction bearing 28, by means of a press fit, is a carrier shifter sleeve 90, having external longitudinal splines 91 for slidably mounting a carrier 92 thereon. The carrier has a collar portion 92' provided with internal longitudinal grooves 93 for accommodating the splines 91. The carrier also includes a head portion 94 having spaced apart outwardly extending lugs 95 and 96 on one diametrical side thereof (see FIG. 2).

The valve 88 has a body portion 97 at the base of the conical valving portion which is directly mounted on the carrier 92 in the space between the lugs 95 and 96 on a pin 98 that extends through an opening in the head portion 97 and through the lugs 95 and 96 for retaining the valve with the longitudinal axis thereof in registry with the longitudinal axis of the outlet port 87 in the valve seat member 86. The valve 88 preferably has slight rocking movement on the pin 98, to assure seating thereof on the valve seat member 86 when the outlet port is to be completely closed. The carrier 92 is reciprocated on the sleeve 90 to shift the valving portion 89 of the valve into and out of the valve port 87, as now to be described.

Mounted on the collar portion 92' of the carrier 92 between a shoulder 99 and a retainer ring 100 is the inner race 101 of an antifriction bearing 102, the outer race 103 of which mounts a shifting collar 104. The collar 104 is retained on the outer race of the antifriction bearing by an inwardly extending flange 105 on one side thereof and a retaining ring 106 on the other side thereof and secured in a groove 107 formed in the inner face of the shifting collar 104, as best shown in FIG. 1. Extending outwardly from opposite diametrical sides of the shifting collar 104 are lugs 108 and 109, carrying outwardly projecting trunnions 110 and 111. The trunnions 110 and 111 engage in slots 112 and 113 in the depending arms 114 of bell crank levers 115 and 116. The bell crank levers are pivotally carried on pins 117 and 118. The pins 117 and 118 are carried by horizontal posts 119 and 120 that are carried by the end plate 7, as best shown in FIGS. 2 and 8. The posts have reduced ends 121 that are retained in sockets 122 provided in bosses 123 on the plate 7. The reduced ends of the posts are anchored in the sockets by cap screws 124 having shanks 125 extending through suitable openings 126 in the end plate 7 and into threaded sockets 127 of the posts, as best shown in FIG. 8.

The other arms 128 of the bell cranks extend toward the plate 7 and are connected with the arms 129 and 130 of a yoke 131 by means of pins 132. The yoke has a lug 133. The yoke is raised and lowered to rock the bell cranks by means of a reciprocating rod 134 that is slidably mounted within a bushing 135 contained in a vertical opening 136 that is formed through the central section 4 of the casing on one end of the longitudinal boss 26 previously mentioned. The opening 136 is counterbored as at 137 to contain an oil seal 138 for sealing around the rod 134. The rod 134 has a threaded extension 139 forming a shoulder 140. Mounted on the extension and engaging the shoulder 140 by means of a nut 141 threaded on the extension 139 is a bracket 142. The bracket 142 has depending ears 143 engaging an ear 144 on the yoke 131 previously described. The ear 144 is hingedly connected to the ears 143 by a transverse pin 145 (FIGS. 1 and 7).

The rod 134 is reciprocated by a rock lever 146 that is pivoted exteriorly of the casing on a link 147 (FIG. 1). The link 147 has one end pivotally mounted on a transverse pin 148 that extends transversely of a recess 149 substantially in the center of the longitudinal boss 26, as shown in FIG. 1. The upper end of the link has a slot 150 for passing the rock lever 146 therethrough. The rock lever 146 is pivoted to the slotted end of the link by a pin 151. One end 152 of the rock lever may be connected with an operating mechanism, not shown, or it may be moved by hand. The opposite end 153 is engaged in a slot 154 at the upper end of the rod 134 and is pivotally retained therein by a transverse pin 155.

The opposite end of the longitudinal boss 26 has a fill opening 156, normally closed by a threaded plug 157. Hydraulic fluid is removed from the casing 2 through a drain opening 158 located in the end plate 6 and is closed by a threaded plug 159.

The inner boss 23 is provided with a counterbore 160 for seating therein a ring-shaped brake drum 161. The brake drum is retained in the counterbore by fastening devices, such as machine screws 162, having their shanks 163 extending through openings 164 in the brake drum and into threaded sockets 165 in the boss 23. The inner annular face 166 of the brake drum is of conical shape, to be engaged by a conical peripheral face 167 of a brake shoe 168. The brake shoe 168 is in the form of a disk and has an axial opening 169 of a shape to accommodate the cross sectional contour of the sleeve 90, so that it is keyed thereto to turn with the sleeve.

Assuming that the speed change device is constructed as described and that the shaft 35 is connected with a suitable prime mover (not shown) and the shaft 37 is connected with a driven mechanism (also not shown), the operation of the speed change device is as follows:

Assuming that the valve 88 is in retracted position with respect to the valve seat member 86, and that the chamber 10 is filled with a hydraulic fluid, rotation of the power input shaft 35 will drive the driven element 42, but the hydraulic fluid that is contained in the spaces between the teeth of the driving and driven elements 41 and 42 will be discharged freely through the open port 87 and there will be no rotation of the power output shaft 37. While the shaft 37 may tend to creep incidental to movement of the hydraulic fluid, such creepage will be prevented, because in the open position of the valve 88 the collar portion 92' of the carrier 92 abuts the brake shoe 168 and urges the brake shoe 168 into engagement with the brake drum 161 (see FIG. 10). In this position of the valve, the rod 134 has been shifted to its uppermost position and the bell cranks 115 and 116 are retaining the shifting collar 104 in its rearmost position, to hold the valving element 88 in wide open position relative to the valve seat member and to set the brake shoe 168 for stopping rotation of the power output shaft 37, as just described.

In order to start rotation of the output shaft 37, the end 152 of the rock lever 146 will be lifted so that the end 153 pushes the rod 134 inwardly of the casing. This movement of the rod 134 moves the yoke 131 downwardly and swings the bell crank levers 115 and 116 on the fixed pins 117 and 118. This movement of the bell crank levers pushes against the trunnions 110 and 111 and moves the valve carrier 92 forwardly upon the sleeves 90, to move the cone portion 89 of the valve 88 into the port 87 of the valve seat member, to thereby valve the flow of hydraulic fluid. This creates a back pressure within the spaces between the teeth of the driving and driven elements 41 and 42 and causes the driven element 42 to turn. The eccentric mounting thereof in turn causes the casing 44 to start rotation in the direction of the arrow "a" (FIG. 4) to turn the power outlet shaft to start rotation of the driven mechanism.

The carrier 92, being splined to the sleeve 90 and the sleeve 90 being fixed to the shaft 37, will rotate with the casing 44 and retain alignment of the valve 88 with its seat member 86. During rotation of the carrier 92, the antifriction bearings 102 will rotate within the shifting collar 104, since the shifting collar is held stationary by its connection with the bell cranks 115 and 116 and their connection with the posts 119 and 120.

With further movement of the lever 152, the cone shaped portion of the valve 88 will be projected further into the valve seat member to effect a corresponding acceleration in the speed of the power output shaft 37. The speed will accelerate until the base of the cone portion of the valve completely plugs the port 87 of the valve seat member, whereupon there can be no flow through the spaces between the teeth of the driving and driven elements and all of the parts within the casing will rotate at the speed of the power input shaft 35 to drive the power output shaft 37 at its maximum speed. By shifting the lever 146 in the opposite direction, the valve 88 will be retracted from the seat member to allow flow of hydraulic fluid through the port 87, whereupon the speed of the power output shaft will be reduced. During rotation of the casing 44, the spiral fin 83 is rotating witth the outer end thereof moving into the hydraulic fluid contained in the casing 2, so as to cause positive flow of the hydraulic fluid into the funnel-shaped inlet 82 of the linet port 79. This movement of the hydraulic fluid prevents cavitation, so that the spaces between the driving and driven elements 41 and 42 are kept filled to their full capacity. Any hydraulic fluid not needed to fill the spaces within the casing 44 will merely flow out of the space between the spiral fin 83 and the hub 54 back into the chamber 10.

The driving and driven elements, including the casing in which they are contained, actually form a pump for pumping hydraulic fluid from the inlet port to the outlet port, and by valving the outlet port for creating a back pressure in the pump, the pump casing will rotate at a rate corresponding to the back pressure created between the driving and driven elements, thereby providing a hydraulically locked coupling between the power input and output shafts, and the relative speed of the output shaft may be infinitely controlled merely by shifting the lever 146 in the desired direction while the device is in motion. Thus the driven mechanism may be gradually brought up to speed and the speed reduced at will, to suit the power and speed conditions.

I claim and desire to secure by Letters Patent:

1. A variable speed device including a fixed casing for containing hydraulic fluid, a rotary casing, means for rotatably mounting the rotary casing in the fixed casing for bodily movement through the hydraulic fluid and having an inlet and an outlet on opposite sides thereof for flow of hydraulic fluid into and from the rotary casing, a driving element in the rotary casing, a power input shaft rotatably mounted in the fixed casing and extending into the rotary casing to actuate the driving element, a driven element in the rotary casing and actuated by the driving element for moving the hydraulic fluid from the inlet to the outlet, a conical valve for valving flow of fluid from the outlet into the fixed casing, a power output shaft extending into the fixed casing and having direct connection with the rotary casing on the side thereof having the outlet, a carrier having a collar slidably keyed on the power output shaft for bodily carrying the conical valve for rotation with the rotary casing, a ring member having rotatable support on the collar of the carrier and provided with trunnions on opposite diametric sides thereof, bell crank levers connected with the trunnions, means for pivotally supporting the bell crank levers in the fixed casing on opposite sides of the power output shaft, a yoke connecting the bell cranks, a rod reciprocable in the fixed casing and having connection with the yoke, and means externally of the fixed casing for reciprocating the rod to shift the carrier on the power output shaft for moving the valve to and from the outlet for controlling speed of the rotary casing.

2. A variable speed device including a fixed casing for containing hydraulic fluid, a rotary casing, means for rotatably mounting the rotary casing in the fixed casing for bodily movement through the hydraulic fluid and having an inlet and an outlet on opposite sides thereof for flow of hydraulic fluid, a driving element in the rotary casing, a power input shaft rotatably mounted in the fixed casing and extending into the rotary casing to actuate the driving element, a driven element in the rotary casing and actuated by the driving element for moving the hydraulic fluid from the inlet to the outlet, a valve for valving flow of fluid from the outlet, a power output shaft extending into the fixed casing and having connection with the rotary casing on the side thereof having the outlet, a carrier on the power output shaft for carrying the valve, splines on the power output shaft for keying the carrier for rotation with the rotary casing, a ring member having rotatable support on the carrier and provided with trunnions on opposite diametric sides thereof, bell crank levers connected with the trunnions, means for pivotally supporting the bell crank levers in the fixed casing on opposite sides of the power output shaft, a yoke connecting the bell cranks, a rod reciprocable in the fixed casing and having connection with the yoke, means externally of the fixed casing for reciprocating the rod to rock the bell cranks to shift the carrier on the power output shaft for moving the valve to and from the outlet for controlling speed of the rotary casing, a brake element fixed to the fixed casing in encircling relation with the power output shaft, and a brake element between the carrier and the fixed brake element and keyed to said splines for rotation with the carrier and engageable therewith to engage the brake elements when the valve is in fully open position to prevent creepage of the power output shaft.

3. A variable speed device including a casing for containing hydraulic fluid, axially aligned power input and output shafts rotatable in opposite sides of the casing, a rotor having one side fixed to the power output shaft and the opposite side journaled on the power input shaft and having an internal chamber eccentric to the axis of said shafts, said rotor having an arcuate inlet port in a side thereof which is journaled on the power input shaft and having a funnel-shaped inlet with the wider end at the leading end of said port, said rotor having an arcuate groove within the inner face of the opposite side and provided with an outlet port opening from said groove into the casing, a ring gear element rotatable in the chamber and having internal teeth, a gear element in the ring gear and having teeth meshing with the teeth of the ring gear element, means securing the gear element to the power input shaft to drive the ring gear element for moving the hydraulic fluid from the arcuate inlet port into spaces opening up between said teeth of the gear elements and to discharge the fluid from said spaces into the arcuate groove as the spaces close on the side having the outlet port, means for controlling discharge of fluid through said outlet port to effect rotation of the power output shaft, and a vane extending from the rotor on the outer side of the funnel-shaped inlet and terminating at the larger end of the funnel for directing fluid into the inlet to eliminate cavitation in said rotor.

References Cited by the Examiner
UNITED STATES PATENTS

| | | | |
|---|---|---|---|
| 1,249,660 | 12/17 | Olson | 192—61 X |
| 2,101,899 | 12/37 | Eddins | 192—61 |
| 2,244,929 | 6/41 | Wall | 192—61 |
| 2,311,237 | 2/43 | Loveday | 192—61 |
| 2,358,058 | 9/44 | Crites | 192—61 |
| 2,727,607 | 12/55 | Colmerauer | 192—61 |
| 3,050,167 | 8/62 | Lewis | 192—61 |

DAVID J. WILLIAMOWSKY, *Primary Examiner.*
THOMAS J. HICKEY, *Examiner.*